United States Patent [19]

Sakai

[11] Patent Number: 5,002,204

[45] Date of Patent: Mar. 26, 1991

[54] DRINK SUPPLY SYSTEM HAVING STERILIZATION MEANS

[75] Inventor: Kiyoshi Sakai, Saitama, Japan

[73] Assignee: Sanyo Electric Co., Ltd., Osaka, Japan

[21] Appl. No.: 378,601

[22] Filed: Jul. 11, 1989

[30] Foreign Application Priority Data

Jul. 18, 1988 [JP] Japan .................. 63-178819

[51] Int. Cl.⁵ .............. B67D 5/56; C02F 1/467; B01D 17/06; B01D 35/06
[52] U.S. Cl. ..................... 222/129.1; 422/22; 210/198.1; 210/243; 210/748; 204/149
[58] Field of Search .............. 222/129.1, 129.2, 129.3, 222/129.4; 204/128, 149; 210/198.1, 748, 243; 422/22; 239/690

[56] References Cited

U.S. PATENT DOCUMENTS

| | | | |
|---|---|---|---|
| 3,649,493 | 3/1972 | Meiners et al. | 422/22 |
| 4,582,226 | 4/1986 | Doak | 222/129.1 X |
| 4,687,120 | 8/1987 | McMillin | 222/129.1 X |
| 4,911,832 | 3/1990 | Miller et al. | 210/198.1 X |

FOREIGN PATENT DOCUMENTS 56-31489 3/1981 Japan .
59-150590 8/1984 Japan .
61-283391 12/1986 Japan .

Primary Examiner—Michael S. Huppert
Assistant Examiner—K. DeRosa
Attorney, Agent, or Firm—Darby & Darby

[57] ABSTRACT

A drink supply valve in which either diluting water or carbonated water obtained from a city water supply and supplied to the valve inlet is mixed with syrup at the valve outlet and a pair or pairs of electrodes are located in one or more of the passages between the inlet and outlet for transforming chlorine ions contained in the diluting water or the carbonated water into chlorine for sterilization.

4 Claims, 6 Drawing Sheets

DRINK SUPPLY SYSTEM HAVING STERILIZATION MEANS

FIELD OF THE INVENTION

The invention relates to a drink supply system having a sterilization means for sterilizing a drink supply line connected with a city water line.

BACKGROUND OF THE INVENTION

Drink supply systems for supplying a dispensing machine with cold drink, such as cold water supplied from city water, or cold carbonated drinks to dilute syrup in a cup, must generally be maintained hygienically, so as to prevent propagation of bacteria and the like. There has been known a drink water sterilization means for this purpose, as disclosed in Japanese Patent Early Publication No. 61-283391.

Said sterilization means comprises a pair of electrodes, through which city water is passed to a cistern. Said electrodes are impressed with a DC voltage for electrolysis of the water stored in the cistern, the water being supplied to a drink supply system after it is cooled.

This prior art is based on the fact that, since city water contains chlorine ions ($Cl^-$), aforementioned electrolysis will generate chlorine molecules ($Cl_2$) according to the following chemical reaction:

$$2Cl^- \rightarrow Cl_2 + 2e.$$

The chlorine molecules ($Cl_2$) thus generated is easily dissolved in the drink ($H_2O$) to form hypochlorous acid (HClO) by the reaction:

$$Cl_2 + H_2O \rightarrow HClO + HCl.$$

Since the hypochlorous acid (HClO) formed has sterilization effect, it may sterilize the water in the cistern and the drink supply line.

Such drink supply systems, however, have dispensing nozzles and drink supply valves open to the air, which tend to be unsanitary due to contamination with bacteria. Despite of the fact, the pair of the electrodes for generating hypochlorous acid (HClO) are arranged in the proximity of the cistern in the above drink supply system.

As a result, the hypochlorous acid (HClO) generated in the cistern is passed through a long line to lose its sterilization effect when reached near the dispensing nozzles, and cannot effectively sterilize bacteria propagating at the drink supply valves.

BRIEF SUMMARY OF THE INVENTION

The invention is directed to solve the above mentioned disadvantages encountered in the prior art. The invention provides a drink supply system having a sterilization means that may always maintain its drink supply valve sanitary by effectively sterilizing the portion of the drink supply line open to the air.

Therefore, the drink supply system according to the invention has a pair of electrodes arranged in a drink supply line near a drink supply valve open to the air, said pair of the electrodes being provided with a DC voltage to electrolyze the drink solution staying in the drink supply line and transform chlorine ions into chlorine molecules for sterilization.

The drink supplied and staying in the drink supply line near the drink supply valve is electrolyzed so as to transform chlorine ions into chlorine molecules, carrying out effective sterilization of the drink supply line on the outlet side of the drink supply valve.

BRIEF DESCRIPTION OF THE DRAWINGS

FIG. 2A is an elevational cross section of the drink supply system having a sterilization means shown in FIG. 1, while FIG. 2B is a horizontal cross section of this system.

DETAILED DESCRIPTION OF THE PREFERRED EMBODIMENT

In this embodiment the term "drink supply system" refers to a post-mix type dispenser for preparing drinks by diluting drink materials such as syrups with diluting water obtained from city water or with carbonated water.

Figure 1:
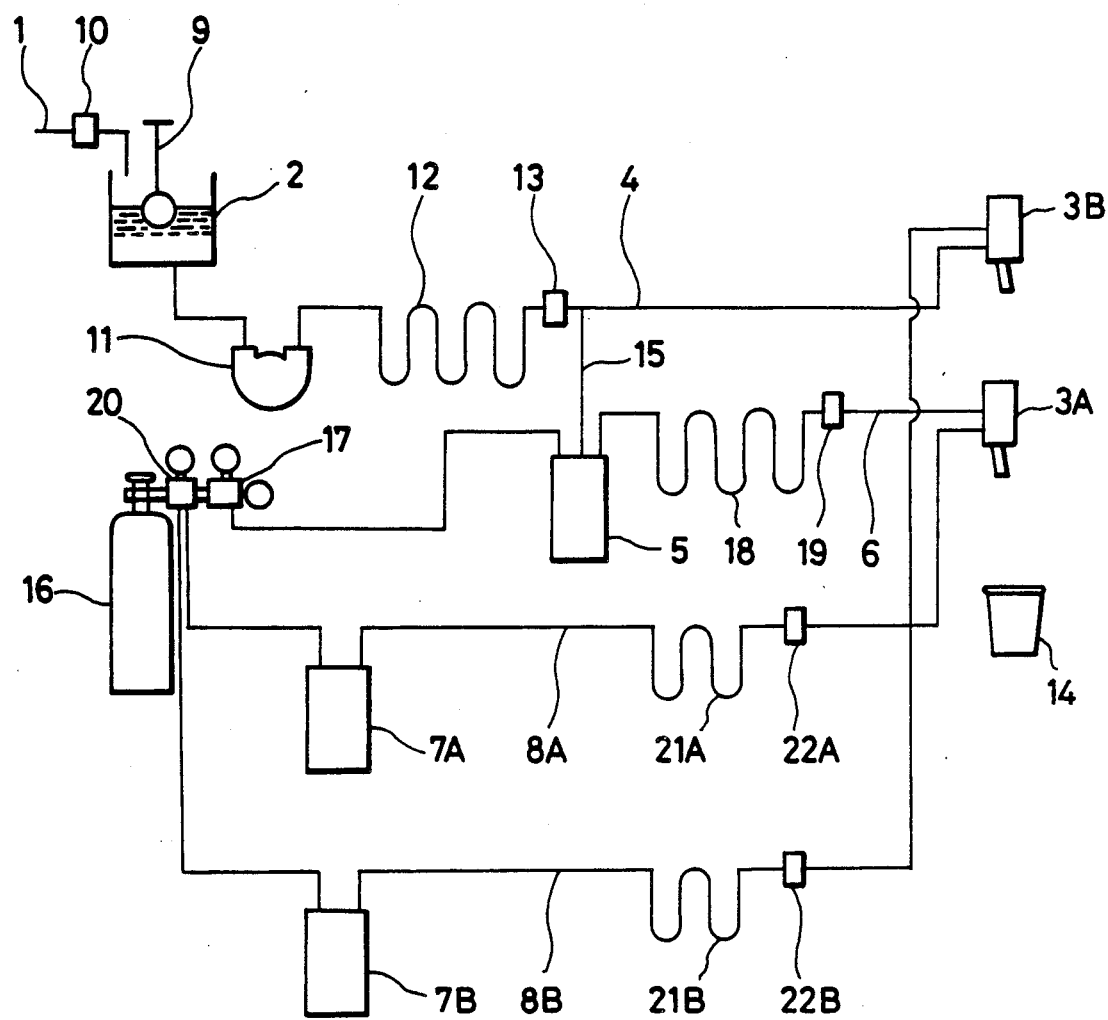
FIG. 1 is a schematic flow diagram for the drink supply system having a sterilization means of an embodiment of the invention.

As shown in FIG. 1, the drink supply line comprises:

a diluting water line 4 disposed between a cistern 2 for storing city water supplied from city water line 1 and a diluting water supply valve 3B;

a carbonated drink supply line 6 disposed between a carbonator 5 and a carbonated water supply valve 3A;

a syrup line 8A disposed between a syrup tank 7A and said carbonated water supply valve 3A;

a syrup line 8B disposed between a syrup tank 7B and a diluting water supply valve 3B.

Said cistern 2 is provided therein with a float 9. As the water level in the cistern 2 lowers to a predetermined height, a water supply valve 10 provided in the city water line 1 opens to supply the water in the water line 1 to the cistern 2 until the float 9 returns to its upper limit position.

The water stored in the cistern 2 is supplied into a cooling coil 12 and a flow regulator 13 by a pump 11 every time vending operation is required, and dispensed into a cup 14 if the diluting water supply valve 3B is opened. If instead the diluting water supply valve 3B is closed, the water is sent rapidly under a high pressure through a connecting line 15 to the inlet of the carbonator 5.

The carbonator 5 is supplied with carbon dioxide gas from a carbon dioxide gas cylinder 16 through a carbon dioxide gas regulator 17 which regulates the gas pressure constant. The carbonator 5 is thus filled with pressurized carbon dioxide gas of a constant pressure. Therefore, when pressurized water is introduced into the carbonator 5 through the connecting line 15 very rapidly, as described above, the water absorbs carbon dioxide gas to make carbonated water in the carbonator, which is stored therein.

Since the carbonator 5 is pressurized by the carbon dioxide gas, the carbonated drink thus stored in the carbonator 5 is sent to said cup 14 through a flow regulator 19 as the carbonated drink supply valve 3A is opened.

The carbon dioxide gas in the carbon dioxide gas cylinder 16 is supplied to the syrup tank 7A and 7B at a constant pressure as regulated by the carbon dioxide gas regulator 20 and the syrup is sent from either tank 7A or 7B to the cup 14 through a cooling coil 21A or 21B and through a flow regulator 22A or 22B when the carbonated drink supply valve 3A or 3B is opened.

Figure 2:
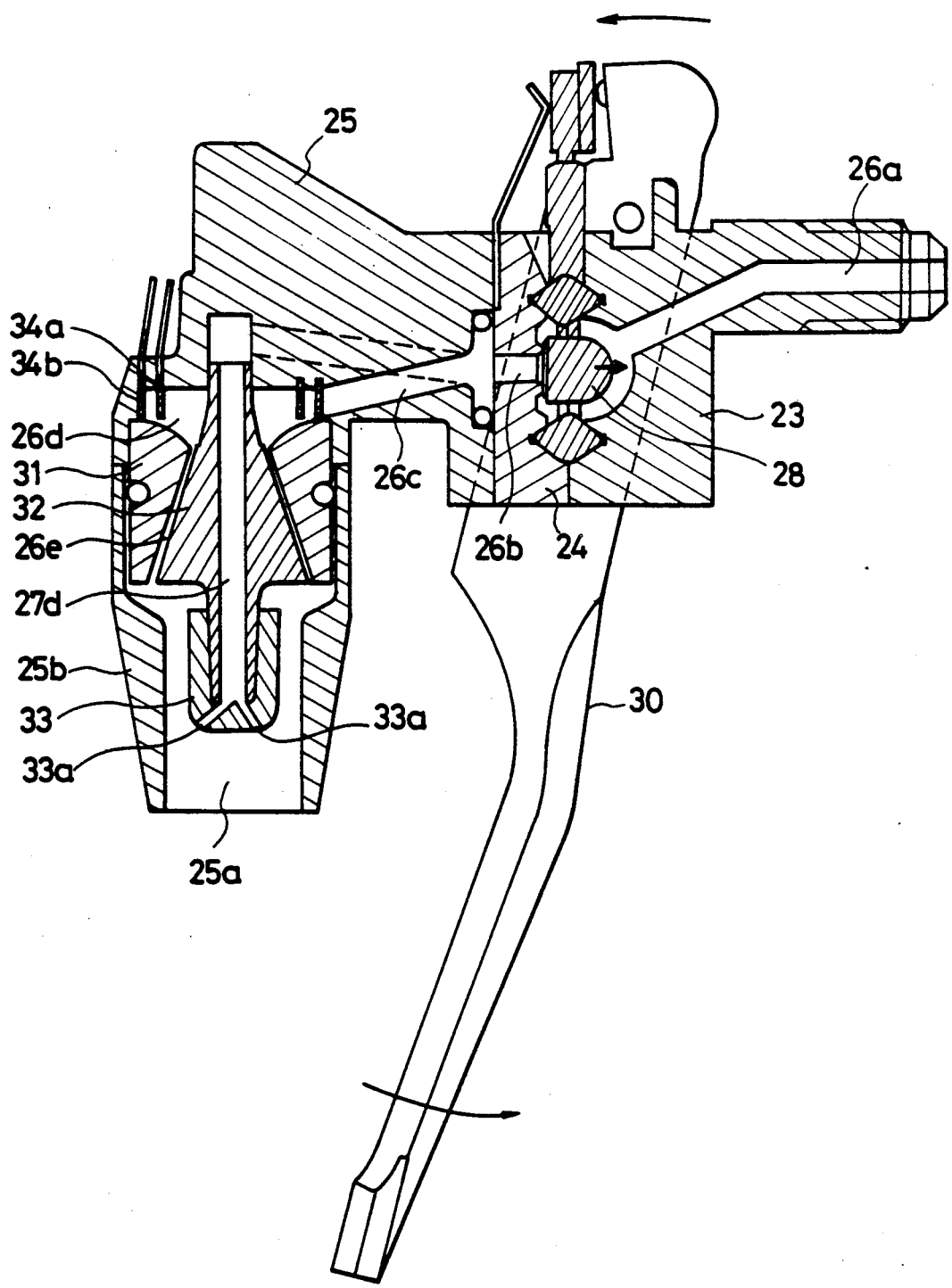
Figure 2:
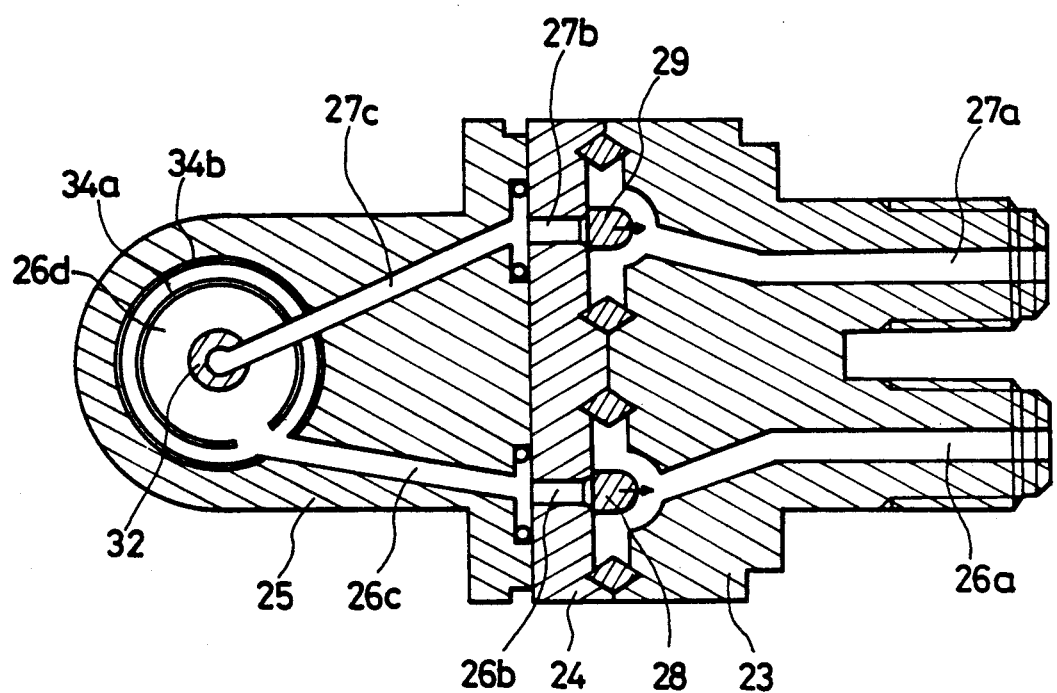

Only the structure of the carbonated drink supply valve 3A is shown in FIGS. 2A and 2B, since the carbonated drink supply valves 3A and 3B are identical in construction.

In FIGS. 2A and 2B, the carbonated drink supply valve 3A is shown to have, in the main, three parts consisting of an inlet valve 23, a sheet valve 24, and a valve head 25. These parts are formed with carbonated drink passages 26a–26c to be connected with said carbonated drink line 6 and with syrup passages 27a–27c to be connected with said syrup lines 8. At the boundary between the inlet valve 23 and the sheet valve 24 is provided a carbonated water valve 28 and a syrup valve 29 in the passages. These valves 28 and 29 engage with a vending lever 30, whose motion in the direction of the arrow causes the valves 28 and 29 in the same direction, connecting the carbonated drink passage 26a with the passages 26b, and the syrup passage 27a with the passage 27b of the sheet valve 24 and the inlet valve 23.

At the outlet port 25a of the valve head 25, are provided a sleeve mixing block 31 and a nozzle mixing block 32, which together form an annular carbonated drink storing passage 26d above the outlet port 25a and at the end of the passage 26c.

The bottom of the carbonated drink passage 26d communicates with a conic carbonated drink passage 26e formed between the sleeve mixing block 31 and the nozzle mixing block 32.

On the other hand the syrup passage 27c formed in the valve head block 25 communicates with the vertical syrup passage 27d formed in the nozzle mixing block 32. Further, a cap 33 having holes 33a is mounted on the tip of the nozzle.

Although a description above is given in relation to the structure of the carbonated drink supply valve 3A for supplying carbonated drink, the same is true for the diluting water supply valve 3B, except that cold water replaces the carbonated water in the latter.

The invention is thus characterized by such carbonated drink supply valve 3A, carbonated drink storing passage 26d for diluting water supply valve 3B, and a pair of electrodes 34a, 34b disposed in the diluting water storing passage.

With the above construction the syrup valve 29 is first opened when carbonated drink is to be supplied, so that, due to the constant pressure of the carbon dioxide gas supplied from the carbon dioxide gas cylinder 16 into the syrup tank 7A through the carbon dioxide gas regulator 20, the syrup in the syrup tank 7A is pumped by the gas pressure to the cooling coil 21A and the flow regulator 22A and further to the carbonated drink supply valve 3A. The syrup is further sent through the syrup passages 27a–27d and released from the holes 33a of the cap 33 mounted on the tip of the nozzle to the opening portion 25a of the valve head 25. In this case a predetermined amount of the cooled syrup is released to the valve outlet 25a.

By opening the carbonated drink valve 28 in synchronism with the syrup valve 29, carbon dioxide gas, regulated to a constant pressure by the carbon dioxide gas regulator 17, is sent to the carbonator 5, which in turn send the carbonated water to the carbonated water supply valve 3A through the cooling coil 18 and the flow regulator 19. This carbonated water is passed through the carbonated drink passages 26a–26e and released torrentially to the opening portion 25a of the valve head block 25, where it is mixed with said syrup. Under this condition a prescribed amount of cooled carbonated water is released to the outlet 25a. At the same time the pump 11 is driven to pump the water stored in the cistern 2 and send the pressurized water rapidly to the carbonator 5 through the cooling coil 12, the flow regulator 13, and the connecting line 15.

In this manner, a predetermined amount of the cooled syrup and the cooled carbonated water are released to the outlet 25a to be mixed there and poured into the cup 14.

On the other hand the water sent rapidly to the carbonator 5 by a pressure becomes carbonate water, replenishing the carbonator 5 with carbonated water. The diluting water supply valve 3B is closed during this process.

The above description explains the supply of carbonated drink. The supply of non-carbonated drink is done by closing the carbonated drink supply valve 3A and opening the diluting water supply valve 3B, and running the pump 11 to pump the water from the cistern 2 to the cooling coil 12 and the flow regulator 13, from which a predetermined amount of cooled water is sent to the diluting water supply valve 3B.

At the same time, as in the foregoing case, the syrup in the syrup tank 7B is forced by the carbon dioxide gas pressure of the carbon gas cylinder 16 to the diluting water supply valve 3B through the cooling coil 21B and the syrup line 8B having the flow regulator 22B.

The cooled, predetermined amount of the syrup sent to the diluting water supply valve 3B and the syrup are mixed at the outlet of the valve head block (not shown in the figure) in just the same way as for the carbonated drink, and poured into the cup 14. The supply of non-carbonated drink is carried out in this way.

The above drink supply operations temporarily leaves the carbonated drink or the diluting water in the portions of the carbonated water passages 26a–26e or in the diluting water passages (not shown in the figures) past the valve 28 and connected with the outlet 25a. This water would invite bacteria therein and allow it to propagate in the carbonated drink passage 26a or the diluting water passage located on the inlet side of the closed carbonated drink supply valve 3A or diluting water valve 3B.

In order to prevent the intrusion of such bacteria into the drink supply valves, a pair of electrodes 34a and 34b are provided in the carbonated drink storing passage 26d of the embodiment. These electrodes 34a and 34b, spaced apart at a distance of about 1 mm, are disposed as coaxial cylinders in the annular carbonated drink storing passage 26d, except the region into which carbonated drink is introduced. The electrodes 34a and 34b may be easily installed in the valve head block 25 by partially embedding them at the time of molding the 25 by plastic injection.

The carbonated water passages 26b–26d in the downstream of the valve 28 are filled with carbonated drink at the time of each operation of dispensing the carbonated drink and remain there. Therefore, if a DC voltage is continuously applied across the electrodes 34a and $34b$, the chlorine ions contained in the carbonated drink are changed to chlorine molecules, which are dissolved in the water to form hypochlorous acid to sterilize the water, as described above. At the same time the following reactions will take place in the neighborhood of the cathode $$2H^+ + 2e \rightarrow H_2 \uparrow,$$

and in the neighborhood of the anode $$4OH^- \rightarrow O_2 \uparrow + 2H_2O + 4e$$

$$(2Cl^- \rightarrow 2e + Cl^2),$$

generating hydrogen gas and $O_2$ gas, which are released in the air.

As the hydrogen and oxygen gases are produced by the electrodes $34a$ and $34b$ in this manner, the carbonated water standing between the electrodes and containing hypochlorous acid is forced to move downstream by the pressure of the gases, down to the carbonated water passage $26e$ between the sleeve mixing block 31 and the nozzle mixing block 32 to thereby sterilize the passage.

It is noted that the carbonated water in the carbonated water storing passage $26d$ gradually flows away from the carbonated water passage $26e$ after the supply of the carbonated water therein is stopped, and that the electric current will be naturally cut down when the carbonated water disappears from between the electrodes, so that there is no wasting of electricity if the DC voltage is applied constantly across the electrodes $34a$ and $34b$.

Incidentally, in addition to the hydrogen gas, calcium and magnesium contained in the carbonated drink is deposited on the cathode of the electrode pair $34a$ and $34b$, which lowers the efficiency of the electrolysis. To circumvent this disadvantage, the polarity of the electrodes may be switched from time to time so that the materials deposited on, or adhering to, the electrodes may be dissolved. This makes the surfaces of the both electrodes always clean and maintains high chlorine generation efficiency.

Another pair of electrodes (not shown in the figure) is also provided in the diluting water storing passage for the diluting water supply valve 3B required for similar sterilization electrolysis.

The electric current may be passed each time during dispensing the drink, or over a predetermined period of time after the completion of dispensing the drink, or may be started when the drink is not dispensed over a predetermined period.

In the water lines of drink supply system shown in FIG. 1, if a filter is used in the city water line 1 to remove odor arising from city water sterilization, the hypochlorous acid (HClO) in the city water is changed to chlorine ion (Cl$^-$). The above embodiment may transform the chlorine ion (Cl$^-$) back to the chlorine molecule (Cl$_2$), so that the sterilization effect is not prevented by the use of the filter.

The embodiment above has been described for the case in which the sterilization electrodes are disposed in the carbonated water storing passage $26d$ as well as in the diluting water storing passage not shown in the figures. Alternatively, as shown in FIG. 3, the electrodes $35a$, $35b$ may be disposed across the conic carbonated water passage $26e$ formed by the sleeve mixing block 31 and the nozzle mixing block 32, to carry out the sterilization in the carbonated water passage closer to the opening portion.

Figure 4:
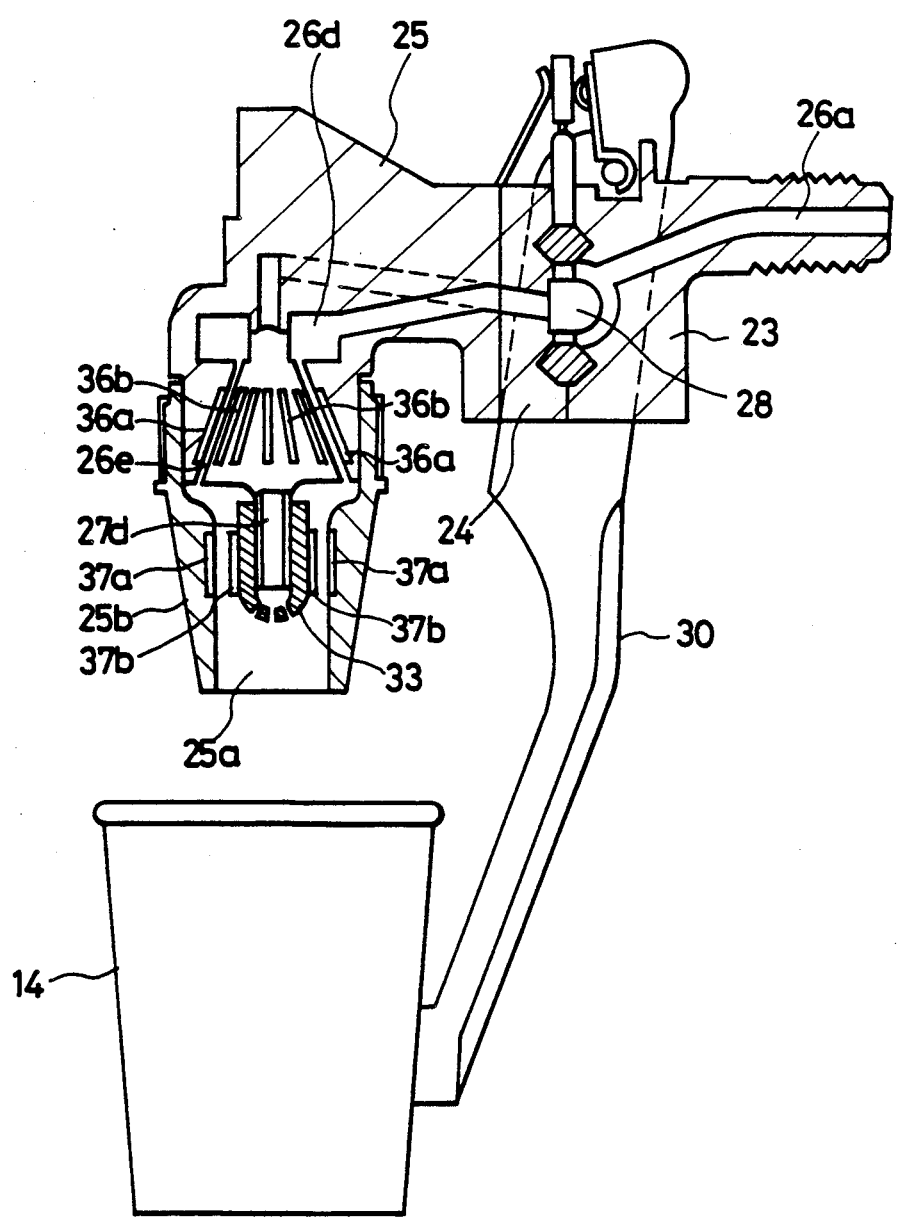
FIG. 4 is a vertical cross section of a drink supply valve for the drink supply system having a sterilization means of still another embodiment of the invention.

Further, the electrodes $36a$ and $36b$ to be disposed across the carbonated water passage $26e$ may be shaped in the form of long strips as shown in FIG. 4, and the other pair of the electrodes $37a$ and $37b$ may be disposed in between the cap 33 of the outlet $25a$ and the cover $25b$ through which the carbonated water is passed.

Figure 5:
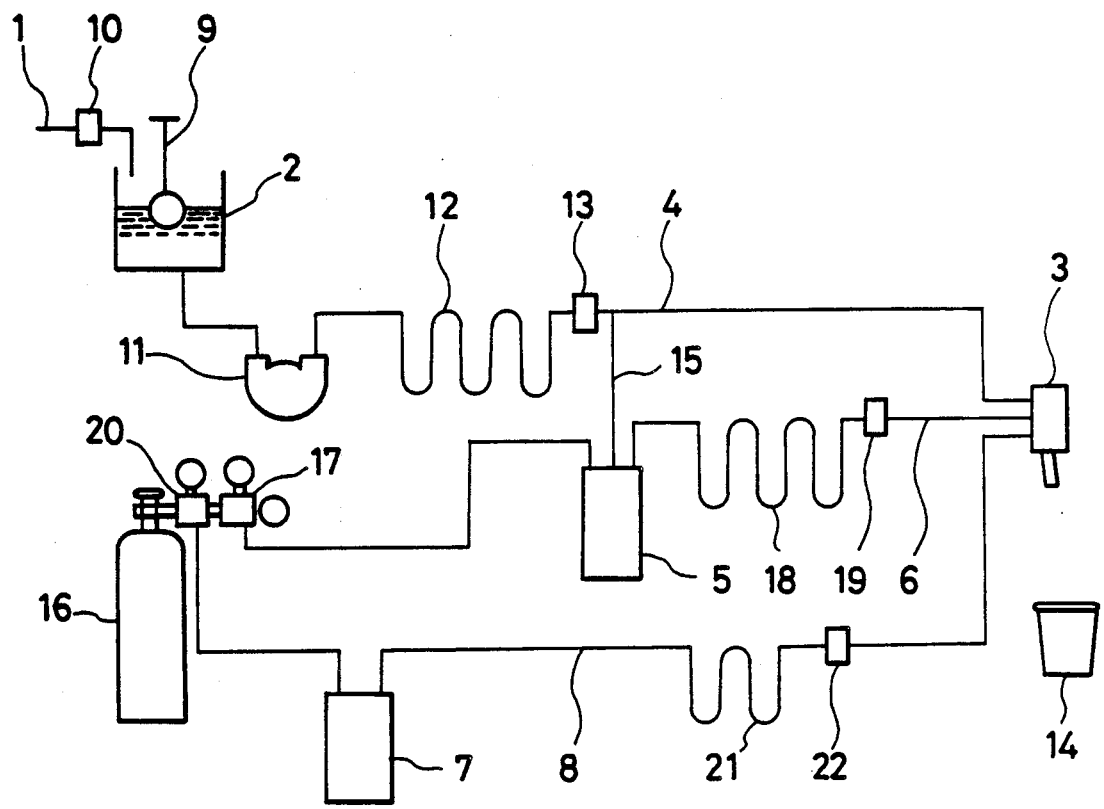
FIG. 5 is a schematic flow diagram for a drink supply system having a sterilization means of another embodiment of the invention.

Still further, the water passage of the drink supply system may have only one drink supply valve 3, and hence only one syrup supply line 8 as shown in FIG. 5, in which case a switching valve is provided at the inlet of the drink supply valve 3 for switching the carbonated water and the diluting water, and, after the diluting water is switched off, the carbonated drink may then be supplied through the water passage formed in the drink supply valve which is identical in structure with the drink supply valve 3 shown in FIG. 2A.

Figure 3:
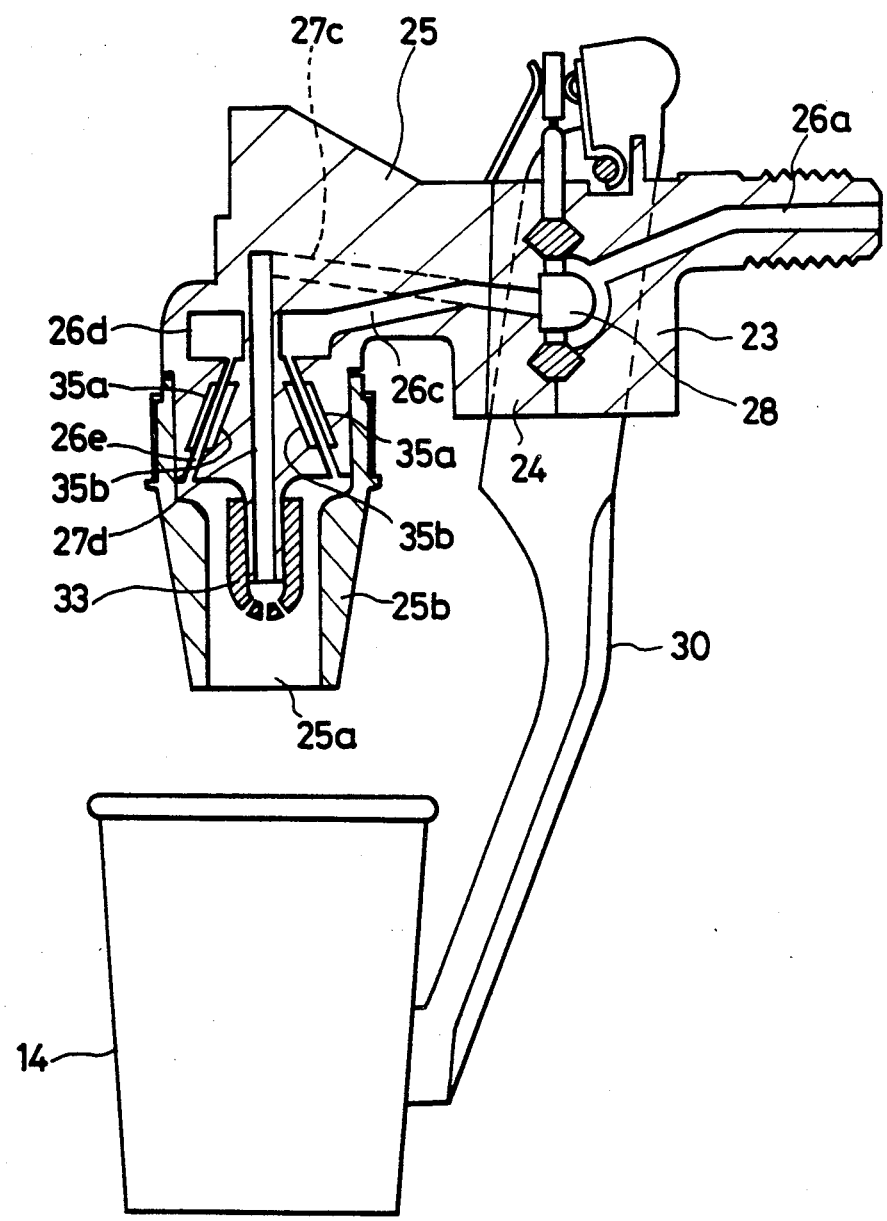
FIG. 3 is a vertical cross section of a drink supply valve for the drink supply system having a sterilization means of another embodiment of the invention.

It should be noted that in the embodiments shown in FIGS. 3 through 5 those components having symbols and indices identical with those of FIGS. 1, 2A, and 2B refer to the same components or those components having similar structure or functions, for which no repetitive decriptions are given.

As described above, sterilization may be carried out by simple means in accordance with the invention, i.e. by applying a DC voltage or voltages across a pair or pairs of electrodes disposed in the carbonated water storing passage and/or the diluting water passage formed directly above the opening portion(s) of the drink supply valve(s), preventing propagation of bacteria through the drink supply valve(s) and keep the drink supply system sanitary.

I claim:

1. A drink supply system operating from a city water supply comprising:

a first means including an output line for supplying cooled diluting water obtained from the city water;

a second means including an output supply line for supplying carbonated water by mixing carbon dioxide gas with said city water and cooling it;

syrup supply means including an output supply line that cools syrup and supplying it;

a drink supply valve having inlets for accepting therein the syrup introduced from the syrup output supply line and at least one of said diluting water or carbonated water from one of said first and second means output supply lines, respectively, into respective passages in the valve and for mixing them at the outlet of the drink supply valve to release the mixed drink;

at least one pair of facing electrodes disposed near the valve outlet so as to cross at least one of the passages of the diluting water and the carbonated water in the valve, the diluting water or carbonated water standing between the paired electrodes in the valve passage is electrolyzed by applying a voltage across the electrodes to transform chlorine ions contained in the water into chlorine molecules for sterilization.

2. A drink supply system as defined by claim 1, wherein said drink supply valve comprises two valves, one being a diluting water supply valve for accepting and mixing said syrup and the diluting water to release the mixture and another being a carbonated drink supply valve for accepting and mixing said syrup and carbonated water to release the carbonated mixture, and wherein two syrup output supply lines are provided one each for use with a respective drink supply valve.

3. A drink supply system as defined by claim 2, wherein said diluting water supply valve comprises:
- an inlet portion having therein a syrup passage and a diluting water passage connected with said syrup output supply line and said diluting water output supply line, respectively;
- a sheet valve;
- a valve head;
- a valve operable in response to the motion of a dispensing lever, said valve being provided at the boundary between the inlet portion for the syrup and the diluting water passage and the sheet valve, and wherein
- said pair of electrodes comprise coaxial cylinders disposed in an annular diluting water storing passage which is formed surrounding the syrup passage and above the valve outlet where the syrup passage and the diluting water passage of said valve head merge with each other.

4. A drink supply system as defined by claim 2, wherein said carbonated drink supply valve comprises;
- an inlet portion having therein a syrup passage and a carbonated water passage connected with said syrup output supply line and said carbonated water outlet supply line, respectively;
- a sheet valve;
- a valve head;
- a valve operable in response to the motion of a dispensing lever, said valve being provided at the boundary between the inlet portion for the syrup and the carbonated water passages and the sheet valve, and wherein
- said par of electrodes comprise coaxial cylinders disposed in an annular carbonated water storing passage which is formed surrounding the syrup passage and above the valve outlet where the syrup passage and the diluting water passage of said valve head merge with each other.

* * * * *